US009472914B2

United States Patent
Takahashi et al.

(10) Patent No.: US 9,472,914 B2
(45) Date of Patent: Oct. 18, 2016

(54) ROTARY CONNECTOR HAVING A POSITIVE TEMPERATURE COEFFICIENT DEVICE

(71) Applicant: ALPS ELECTRIC CO., LTD., Tokyo (JP)

(72) Inventors: Seishi Takahashi, Miyagi-ken (JP); Toru Tanaka, Miyagi-ken (JP); Yasunori Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 14/790,236

(22) Filed: Jul. 2, 2015

(65) Prior Publication Data

US 2016/0006203 A1 Jan. 7, 2016

(30) Foreign Application Priority Data

Jul. 4, 2014 (JP) .................................. 2014-138403

(51) Int. Cl.
| | | |
|---|---|---|
| *H01R 39/00* | (2006.01) | |
| *H01R 35/02* | (2006.01) | |
| *B60R 16/027* | (2006.01) | |
| *B60L 11/00* | (2006.01) | |
| *H01R 103/00* | (2006.01) | |
| *H01R 12/59* | (2011.01) | |
| *H01R 13/66* | (2006.01) | |

(52) U.S. Cl.
CPC ............. *H01R 35/025* (2013.01); *B60L 11/00* (2013.01); *B60R 16/027* (2013.01); *H01R 12/592* (2013.01); *H01R 13/6666* (2013.01); *H01R 2103/00* (2013.01); *H01R 2201/26* (2013.01)

(58) Field of Classification Search
CPC . B60R 16/02; B60R 16/0207; B60R 16/023; B60R 16/0231; B60R 16/027; H01R 35/025; H01R 35/04; H01R 2201/26
USPC ....................................... 439/13, 15, 162, 164
See application file for complete search history.

(56) References Cited

U.S. PATENT DOCUMENTS

| | | | | |
|---|---|---|---|---|
| 6,007,355 A * | 12/1999 | Shibata | ................ | B60R 16/027 439/15 |
| 6,299,466 B1 * | 10/2001 | Bolen | ................... | B60R 16/027 439/164 |
| 6,736,645 B2 * | 5/2004 | Kato | ..................... | H01R 35/025 439/15 |
| 6,962,497 B2 * | 11/2005 | Wade | .................... | B60R 16/027 439/15 |
| 2008/0311763 A1 * | 12/2008 | Dubuc | ................. | H02K 11/048 439/18 |

FOREIGN PATENT DOCUMENTS

JP         10-92541         4/1998

* cited by examiner

*Primary Examiner* — Vanessa Girardi
(74) *Attorney, Agent, or Firm* — Brinks Gilson & Lione

(57) ABSTRACT

A rotary connector has a fixed housing, a movable housing that is rotatably linked to the fixed housing, flat cables wound in an annular space formed between the outer tube of the fixed housing and the inner tube of the movable housing, and a first connector connected to ends of the flat cables in their longitudinal directions. The first connector has connection terminals, a base, and, a cable retaining part. Each connection terminal has a cable attaching part at one end and an outer conductor at the other end, and also has one or more connecting parts. The base has a first plane and a second plane, which face each other. A PTC device is placed on the same side as the first plane. The cable retaining part is placed on the same side as the second plane.

4 Claims, 8 Drawing Sheets

ROTARY CONNECTOR HAVING A POSITIVE TEMPERATURE COEFFICIENT DEVICE

CLAIM OF PRIORITY

This application claims benefit of priority to Japanese Patent Application No. 2014-138403 filed on Jul. 4, 2014, which is hereby incorporated by reference in its entirety.

BACKGROUND

1. Field of the Disclosure

The present disclosure relates to a rotary connector mounted in a vehicle such as an automobile, and more particularly to a rotary connector used to establish an electrical connection between a steering wheel side and a car body side with flat cables.

2. Description of the Related Art

Rotary connectors used to establish an electrical connection between the steering wheel side of an automobile and its car body side are known in art.

Japanese Unexamined Patent Application Publication No. 10-92541 describes a rotary connector (conventional example). In this disclosure a rotary connector 900 described in which an inner case 901 and an outer case 902 are combined so as to be relatively rotatable, a flat cable 904, which is wound, is stored in a space formed between the inner case 901 and the outer case 902, and an external conductor 905 is connected to a conductor 904a at each of the two ends of the flat cable 904 with a connecting part 906, as illustrated in FIG. 8A.

As illustrated in FIG. 8B, at the positive connecting part of the connecting part 906 between the external conductor 905 and the conductor 904a of the flat cable 904, the external conductor 905 and conductor 904a are electrically interconnected through a positive temperature coefficient (PTC) device 910.

With a disclosed technology, since the external conductor 905 and conductor 904a of the flat cable 904 are electrically interconnected through the PTC device 910, even if a circuit connected to the external conductor 905 is shorted, it is possible to prevent the flat cable 904 from being heated, melted, and broken.

In the conventional example described above, however, a PTC device is placed in the vicinity of a flat cable and the flat cable and PTC are directly interconnected. If an overcurrent flows and the PTC device thereby generates heat, the heat is transferred to the flat cable. This has been problematic in that the base material and exterior of the flat cable may be subjected to deterioration, separation, and other damage, the flat cable may thereby be locally bent, and at the worst, the flat cable may be broken.

SUMMARY

A rotary connector has a fixed housing having an outer tube and a movable housing having an inner tube. The movable housing is rotatably linked to the fixed housing. The rotary connector also includes plurality of flat cables, each of which has a strip-shaped conductor covered with an insulating film. The plurality of flat cables is wound in an annular space formed between the outer tube and the inner tube, and a connector connected to ends of the flat cables in their longitudinal direction. Each connector has a plurality of connection terminals, a base that retains the plurality of connection terminals, and a cable retaining part that retains the flat cables. A PTC device is connected in series with at least one of the plurality of connection terminals, Each of the plurality of connection terminals has a cable attaching part connected to the strip-shaped conductor at one end and also has an outer conductor at the other end. The cable attaching part and the outer conductor are interconnected with a connecting part. the base has a first plane and a second plane, which face each other. A plurality of connecting parts are retained between the first plane and the second plane. The PTC device is connected at an intermediate point on the connecting part and is placed on the same side as the first plane. The cable retaining part retains the flat cables and a plurality of cable attaching parts. The cable retaining part is placed on the same side as the second plane.

Accordingly, since the PTC device and flat cables are disposed on opposite sides with respect to the base, even if the PTC generates heat, the heat is not easily transferred to the flat cable. This makes it possible to provide a highly reliable rotary connector that reduces damage to the flat cables.

DESCRIPTION OF THE EXEMPLARY EMBODIMENTS

First Embodiment

A rotary connector 100 according to a first embodiment of the present invention will be described below.

Figure 1:
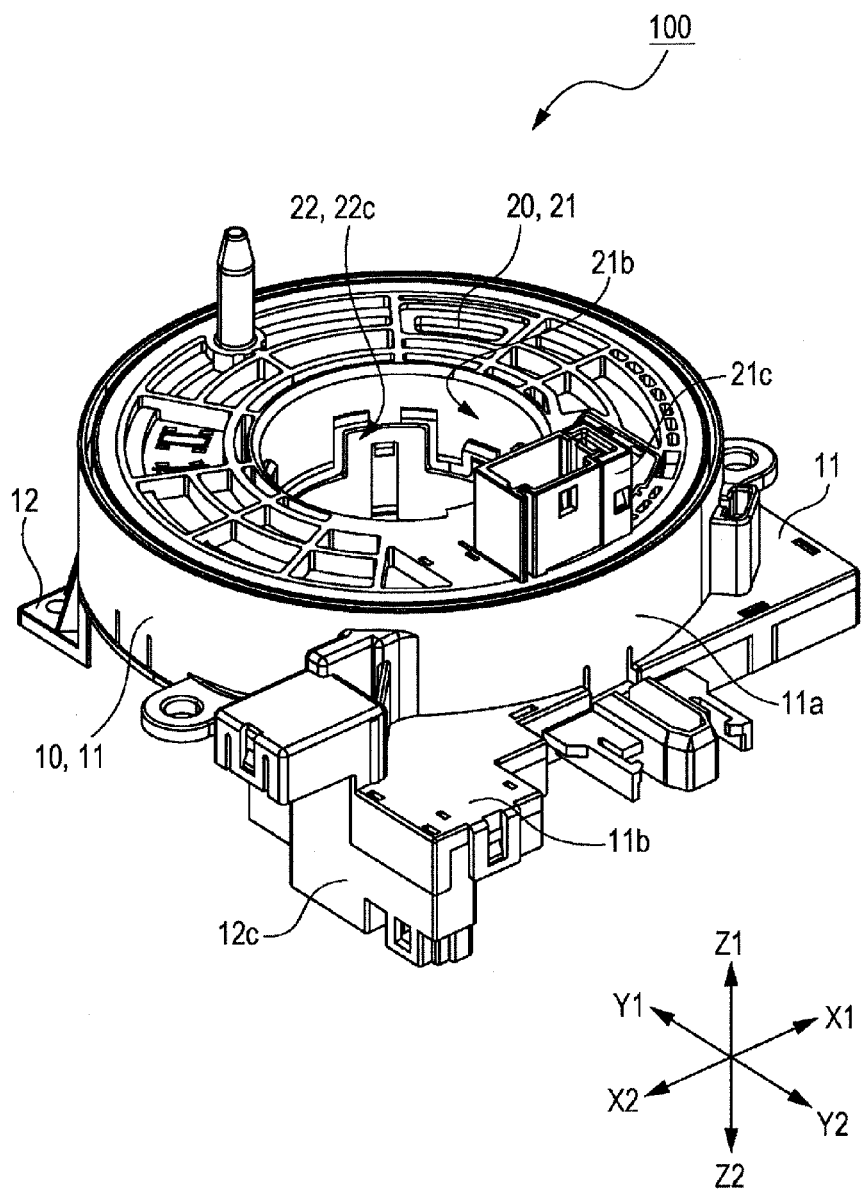
FIG. 1 is a perspective view illustrating the outside shape of a rotary connector according to an embodiment of the present invention.
Figure 2:
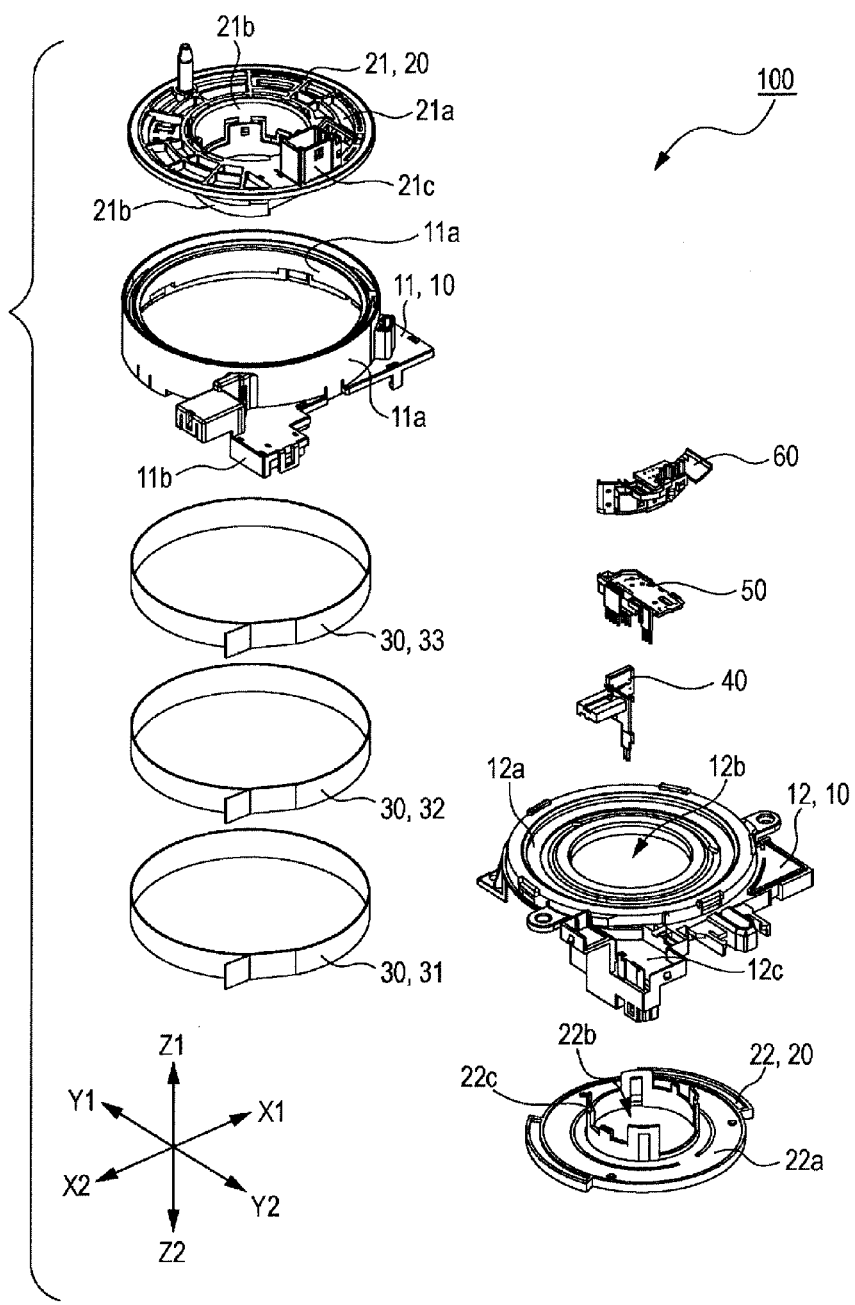
FIG. 2 is an exploded perspective view of the parts constituting the rotary connector according to the embodiment of the present invention.
Figure 3A:
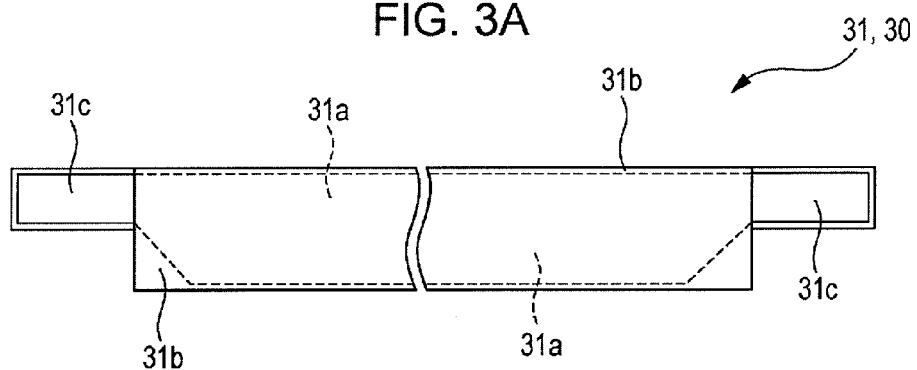
FIGS. 3A to 3C each illustrate a flat cable.
Figure 3B:
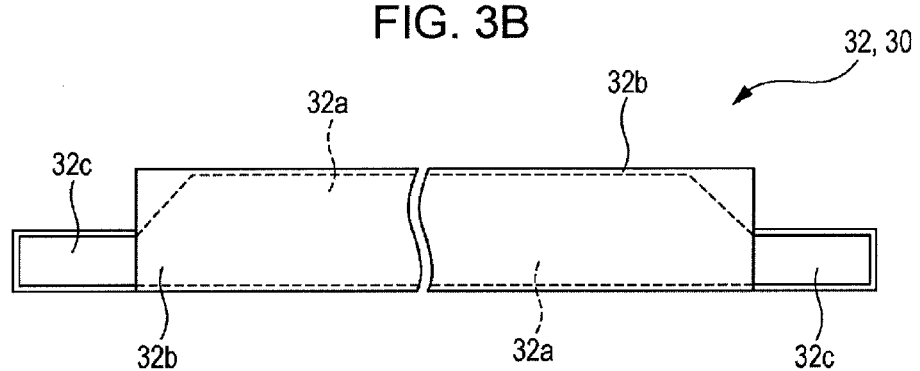
Figure 3C:
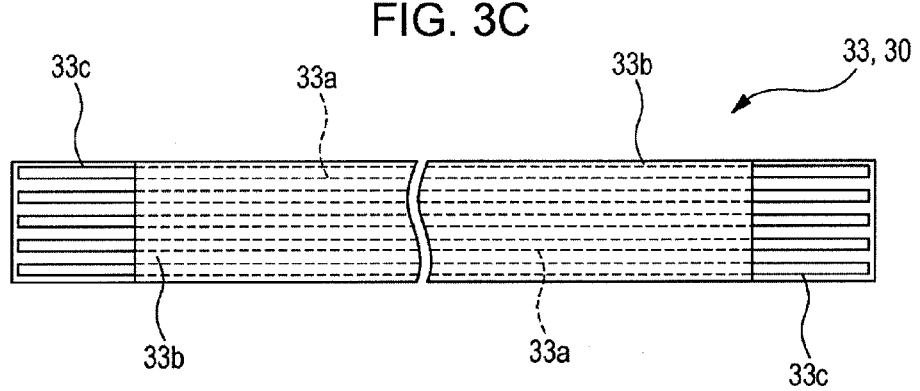
Figure 4:
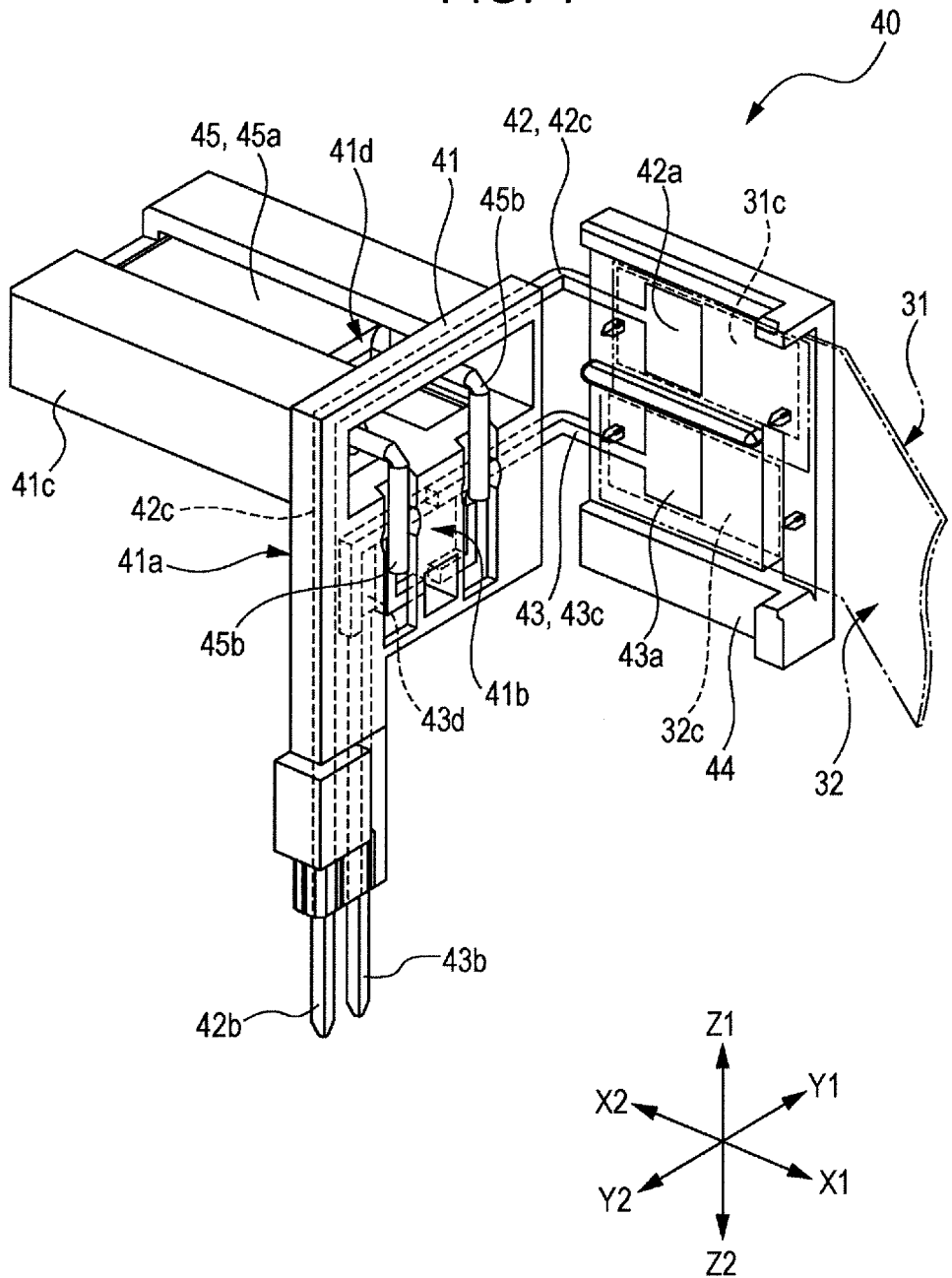
FIG. 4 illustrates a first connector.
Figure 5:
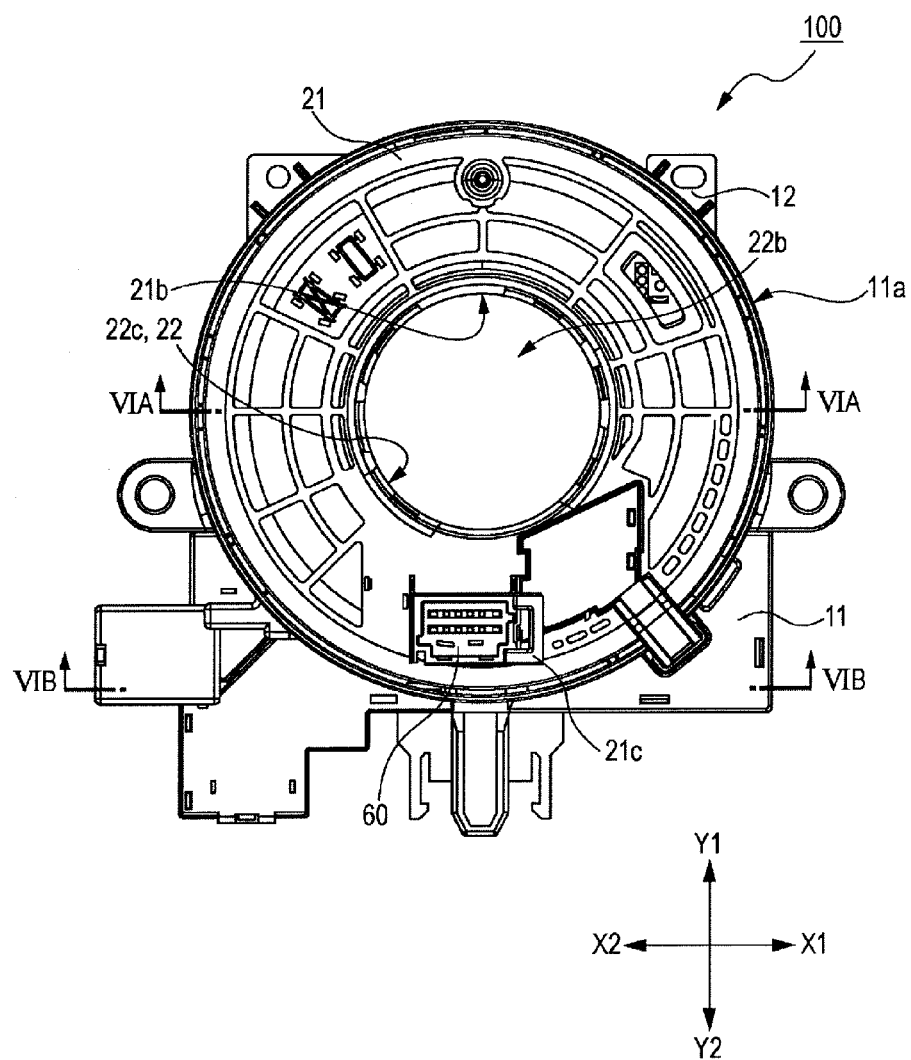
FIG. 5 is a plan view of the rotary connector.
Figure 6A:
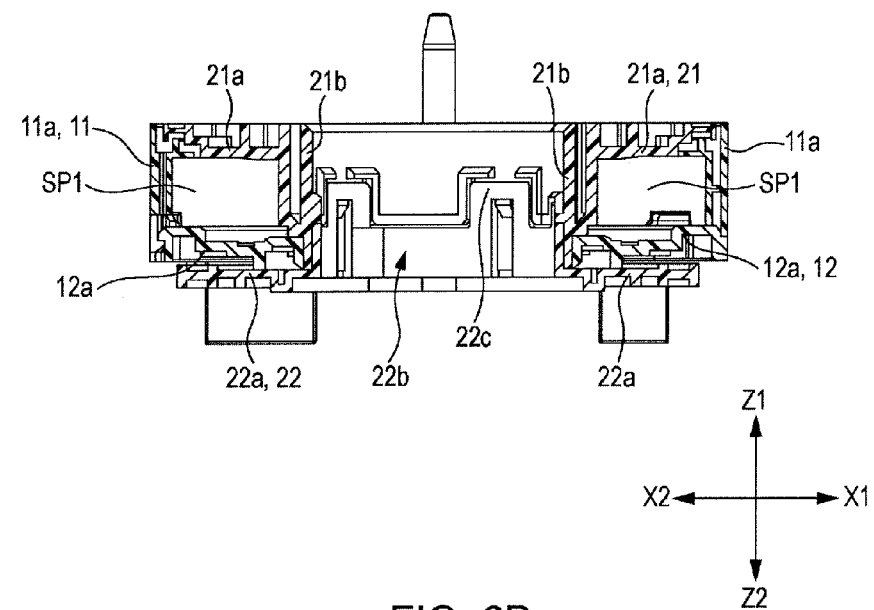
FIGS. 6A and 6B are each a cross-sectional view illustrating the structure of the rotary connector.
Figure 6B:
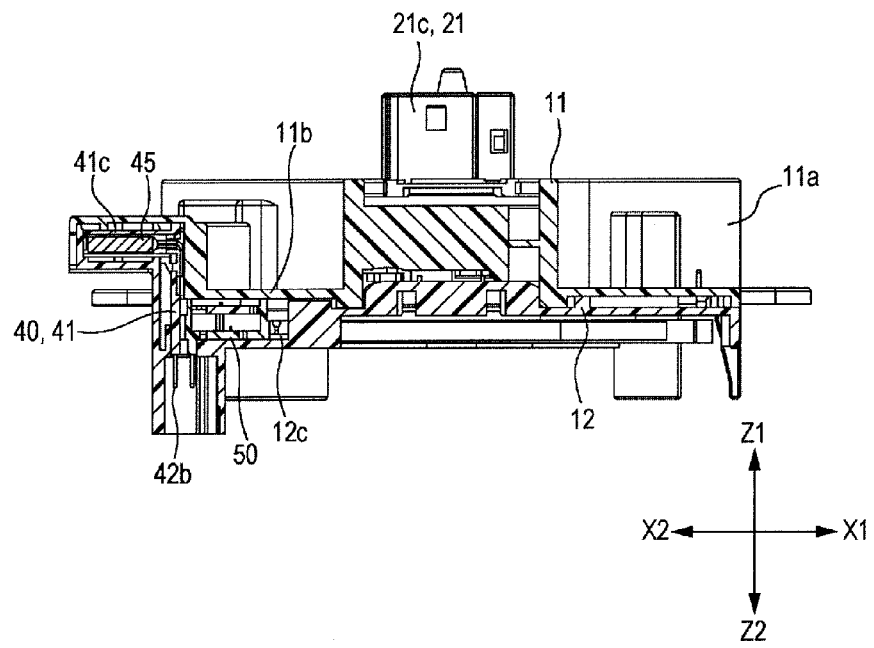

First, the structure of the rotary connector 100 according to this embodiment will be described with reference to FIG. 1 to FIGS. 6A and 6B. FIG. 1 is a perspective view illustrating the outside shape of the rotary connector 100. FIG. 2 is an exploded perspective view illustrating the structure of the rotary connector 100. FIGS. 3A to 3C illustrate flat cables 30; FIG. 3A illustrates a flat cable 31, FIG. 3B illustrates a flat cable 32, and FIG. 3C illustrates a flat cable 33. FIG. 4 illustrates a first connector 40. FIG. 5 is a plan view of the rotary connector 100 when viewed from the same side as its upper surface (indicated by Z1 in FIG. 1). FIGS. 6A and 6B are each a cross-sectional view illustrating the structure of the rotary connector 100; FIG. 6A is a cross-sectional view of the rotary connector 100 as taken along line VIA-VIA in FIG. 5, and FIG. 6B is a cross-sectional view of the rotary connector 100 as taken along line VIB-VIB in FIG. 5. In FIG. 6A, for easy understanding, only an upper stator 11 and a lower stator 12, which constitute a fixed housing 10, and an upper rotor 21 and a lower rotor 22, which constitute a movable housing 20, are indicated; the flat cables 30 are omitted.

As illustrated in FIGS. 1 and 5, the fixed housing 10 and movable housing 20 are combined, forming a substantially annular outside shape of the rotary connector 100.

As illustrated in FIG. 2, the rotary connector 100 includes the upper stator 11 and lower stator 12, which constitute the fixed housing 10, the upper rotor 21 and lower rotor 22, which constitute the movable housing 20, a plurality of flat cables 30, and the first connector 40. In addition, the rotary connector 100 includes a second connector 50 and a third connector 60. In this embodiment, the number of the plurality of flat cables 30 is assumed to be three; when the three flat cables 30 need to be distinguished, they will be described as the flat cable 31, flat cable 32, and flat cable 33.

The upper stator 11 is made of a synthetic resin; the upper stator 11 has a cylindrical outer tube 11a, to the outside of which a cover 11b is attached, as illustrated in FIGS. 1 and 2.

The lower stator 12 is made of a synthetic resin; the lower stator 12 has a bottom part 12a formed in a plate-like annular ring, at the center of which a circular central hole 12b is formed, as illustrated in FIG. 2. A connector mounting part 12c is provided outside the bottom part 12a.

The upper rotor 21 is made of a synthetic resin; the upper rotor 21 has an upper bottom part 21a formed in an annular ring shape and an inner tube 21b formed at the center of the upper bottom part 21a so as to cylindrically protrude downwardly (in the Z2 direction). A connector retaining part 21c is formed on the upper bottom part 21a.

The lower rotor 22 is made of a synthetic resin; the lower rotor 22 has a disk 22a formed like a circular plate, an opening 22b formed circularly at the center of the disk 22a, and engaging clasps 22c extending upwardly (in the Z1 direction) from the outer circumference of the opening 22b.

The flat cable 30 is formed by covering one or a plurality of strip-shaped conductors, each of which is formed with a copper foil or the like, with a flexible insulating film made of polyethylene terephthalate (PET), polyimide, or the like.

The flat cable 31 is formed by covering a single strip-shaped conductor 31a with an insulating film 31b; at both ends of the strip-shaped conductor 31a in its longitudinal direction, a connection end 31c, which is an exposed part of the strip-shaped conductor 31a, is formed, as illustrated in FIG. 3A.

The flat cable 32 is formed by covering a single strip-shaped conductor 32a with an insulating film 32b; at both ends of the strip-shaped conductor 32a in its longitudinal direction, a connection end 32c, which is an exposed part of the strip-shaped conductor 32a, is formed, as illustrated in FIG. 3B.

The flat cable 33 is formed by covering five strip-shaped conductors 33a with an insulating film 33b; at both ends of each strip-shaped conductor 33a in its longitudinal direction, a connection end 33c, which is an exposed part of the strip-shaped conductor 33a, is formed, as illustrated in FIG. 3C.

The first connector 40 includes a base 41, a plurality of connection terminals 42 and 43, and a cable retaining part 44, as illustrated in FIG. 4. A PTC device 45 is connected in series with the connection terminal 43, which is one of the plurality of connection terminals 42 and 43. In this embodiment, the number of the plurality of connection terminals 42 and 43 will be assumed to be two.

The connection terminal 42 is made of a metal material such as copper or brass; a cable attaching part 42a is formed at one end of the connection terminal 42, and an external conductor 42b is formed at the other end, the cable attaching part 42a and external conductor 42b being interconnected with a connecting part 42c, as illustrated in FIG. 4.

The connection terminal 43 is made of a metal material such as copper or brass; a cable attaching part 43a is formed at one end of the connection terminal 43, and an external conductor 43b is formed at the other end, as illustrated in FIG. 4. The cable attaching part 43a and a connecting part 43c are interconnected. The external conductor 43b and a connecting part 43d are interconnected. The PTC device 45 is connected in series with the connection terminal 43 at an intermediate point between the connecting part 43c and the connecting part 43d.

The base 41 is made of a synthetic resin; the base 41 is integrally molded with the connecting parts 42c, 43c, and 43d of the two connection terminals 42 and 43. The base 41 has a first plane 41a (on the same side as X2 in FIG. 4) and a second plane 41b (on the same side as X1 in FIG. 4), which are disposed so as to face each other, as illustrated in FIG. 4. The connecting parts 42c, 43c, and 43d of the two connection terminals 42 and 43 are retained between the first plane 41a and second plane 41b of the base 41. A PTC retaining part 41c is integrally molded with the first plane 41a of the base 41. The PTC device 45 is placed on the same side as the first plane 41a and retained by the PTC retaining part 41c. The PTC retaining part 41c has a slit 41d formed along the PTC device 45.

The cable retaining part 44 is made of a synthetic resin; the cable retaining part 44 is integrally molded with the cable attaching part 42a and 43a of a plurality of (two) connection terminals 42 and 43. The cable retaining part 44 retains the cable attaching part 42a and 43a with their surfaces on one side (on the same side as Y2 in FIG. 4) exposed as illustrated in FIG. 4. The cable retaining part 44 is placed on the same side as the second plane 41b of the base 41. The connecting part 42c of the connection terminal 42 and the connecting part 43c of the connection terminal 43 are exposed between the base 41 and the cable retaining part 44.

Two lead wires 45b protrude from one side (on the same side as X1 in FIG. 4) of the body 45a of the PTC device 45, the body 45a being substantially in a rectangular parallelepiped shape. The two lead wires 45b are bent downwardly (in the Z2 direction) substantially at right angles at an intermediate point. One of the two lead wires 45b of the PTC device 45 is connected to the connecting part 43c of the connecting terminal 43, and the other is connected to the connecting part 43d of the connecting terminal 43, on the same side as the second plane 41b of the base 41. The body 45a is placed on the same side as the first plane 41a of the base 41.

The second connector 50 and third connector 60 are made of a synthetic resin; the second connector 50 and third connector 60 are integrally molded with a plurality of connecting terminals 42 and 43, made of a metal material such as copper or brass, so that the flat cable 30 can be connected.

Next, the structure of the rotary connector 100 will be described with reference to FIG. 1 and FIGS. 4 to 6A and 6B.

The fixed housing 10 is formed by placing the upper stator 11 on the lower stator 12 and locking them, as illustrated in FIGS. 1 and 6A.

The movable housing 20 is formed by aligning the inner tube 21b of the upper rotor 21 with the opening 22b of the lower rotor 22 and causing the engaging clasps 22c to engage the inner tube 21b, as illustrated in FIGS. 1 and 6A.

When the upper rotor 21 is pressed against the fixed housing 10 from the same side as the upper stator 11 and the lower rotor 22 is pressed against the fixed housing 10 from the same side as the lower stator 12 so that the lower rotor 22 is locked to the upper rotor 21 with the fixed housing 10 intervening therebetween, the movable housing 20 is rotatably linked to the fixed housing 10. With the movable housing 20 linked to the fixed housing 10, an annular space SP1 is formed between the outer tube 11a and the inner tube 21b and between the upper bottom part 21a of the upper rotor 21 and the bottom part 12a of the lower stator 12, as illustrated in FIG. 6A.

A plurality of flat cables 30 are stored in the annular space SP1 formed between the outer tube 11a and the inner tube 21b in a state in which the flat cables 30 are wound.

As illustrated in FIG. 4, one end of the flat cable 31 is retained in the cable retaining part 44 in the first connector 40, and the connection end 31c at one end of the strip-shaped conductor 31a is connected to the cable attaching part 42a of the connection terminal 42.

One end of the flat cable 32 is also retained in the cable retaining part 44 in the first connector 40, and the connection end 32c is connected to the cable attaching part 43a of the connection terminal 43.

Therefore, the one end of the flat cable 31 and the one end of the flat cable 32 are retained in the cable retaining part 44 in the first connector 40 on the same side as the second plane 41b of the base 41.

One end of the flat cable 33 is connected to the second connector 50.

The other ends of the three flat cables 30 are connected to the third connector 60.

The first connector 40 and second connector 50 are retained between the connector mounting part 12c disposed on the lower stator 12 and the cover 11b disposed on the upper stator 11, as illustrated in FIG. 6B. The third connector 60 is retained in the connector retaining part 21c disposed on the upper rotor 21, as illustrated in FIG. 5. Thus, electric connections can be established through the plurality of flat cables 30 between an electric part, a circuit, an electric device, and the like connected to the fixed housing 10 and an electric part, a circuit, an electric device, and the like connected to the movable housing 20.

Figure 7:
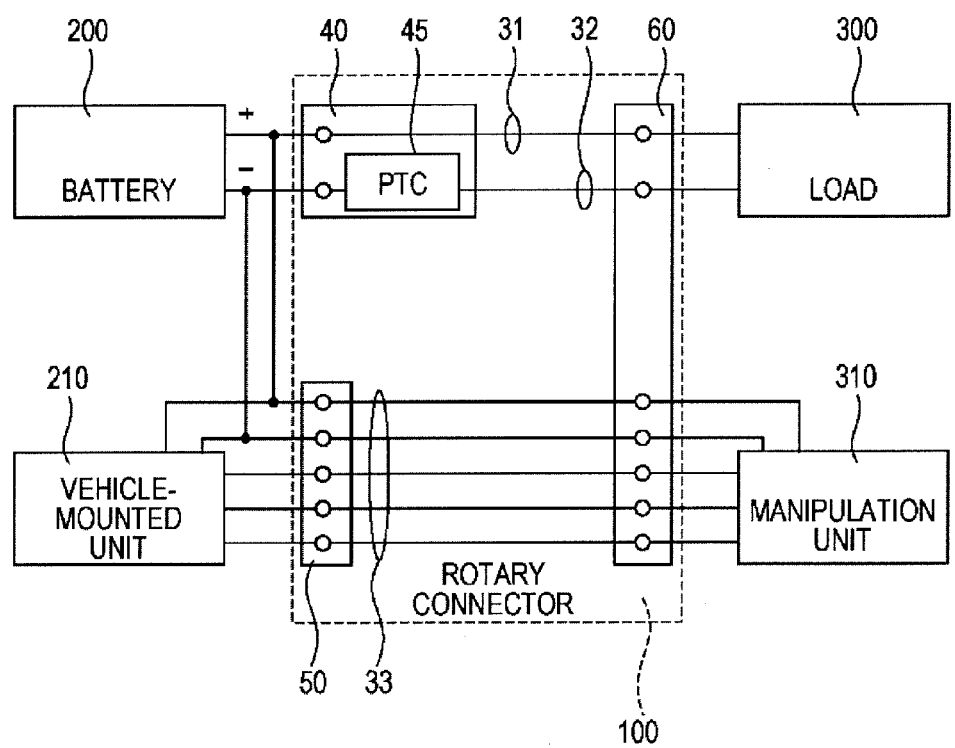
FIG. 7 is a block diagram illustrating connections between the rotary connector and units.
Figure 8A:
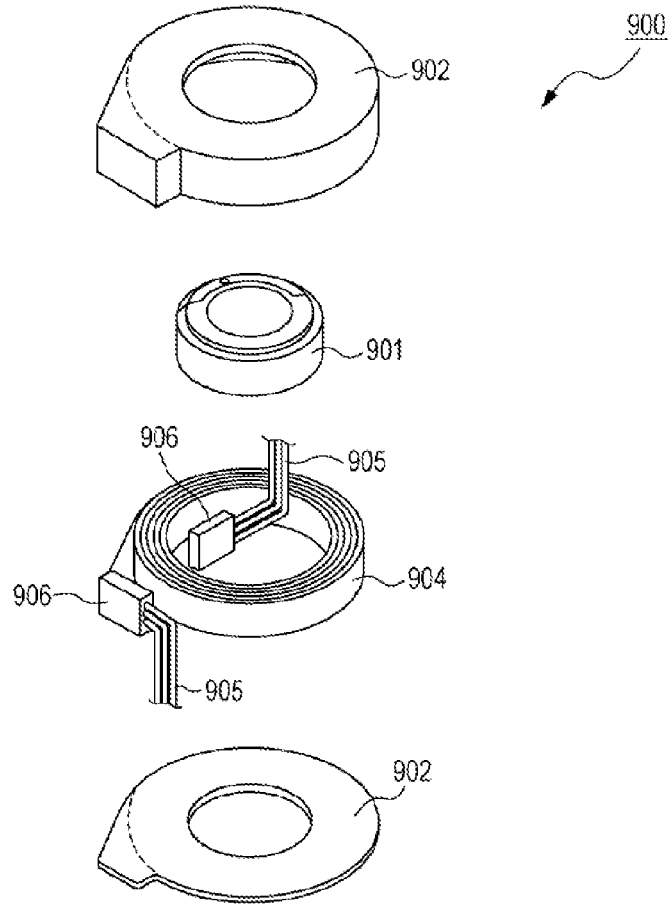
FIGS. 8A and 8B illustrate a conventional exemplary rotary connector.
Figure 8B:
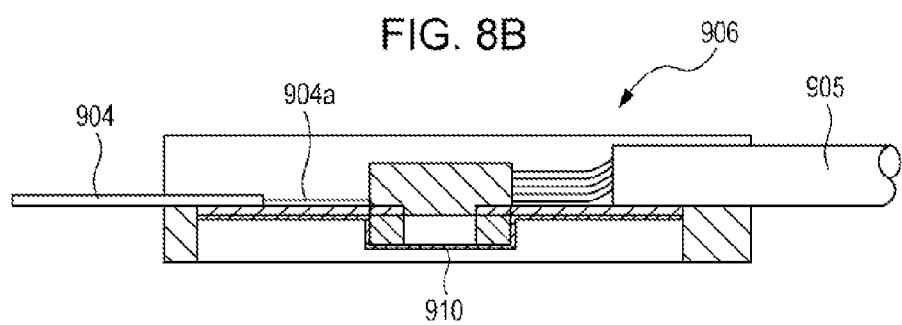

Next, a connection to the an electric device connected to the rotary connector 100 and the function of the PTC device 45 will be described with reference to FIG. 7. FIG. 7 is a block diagram illustrating connections between the rotary connector 100 and units.

As illustrated in FIG. 7, the positive electrode (+) of a battery 200 mounted in a vehicle is connected to a load 300 mounted on the steering side through the flat cable 31 connected to the first connector 40 and the third connector 60. The negative electrode (−) of the battery 200 is connected to the load 300 mounted on the steering side through the flat cable 32 connected to the first connector 40, the PTC device 45, and the third connector 60. Since the PTC device 45 is connected in series with a current path connected to the load 300, the current flowing in the PTC device 45 is the same as the current flowing in the load 300.

A vehicle-mounted unit 210 mounted in the vehicle is connected to a manipulation unit 310 mounted on the steering side through the flat cable 33 connected to the second connector 50 and the third connector 60.

As described above, the battery 200 and vehicle-mounted unit 210, which are mounted on the vehicle side, can be connected to the load 300 and manipulation unit 310, which are mounted on the steering side through the rotary connector 100.

The PTC device 45 has a low resistance in a steady state, so the PTC device 45 does not hinder a current flow into the load 300. Since the current flowing in the PTC device 45 is the same as the current flowing in the load 300, the PTC device 45 is appropriately selected according to a current flowing in the load 300, the current being assumed in advance. If a current larger than assumed in advance flows in the PTC device 45, the PTC device 45 generates heat and its resistance is rapidly increased. When the current flowing into the load 300 is reduced, therefore, it is possible to prevent the flat cable 31, flat cable 32, and load 300 from being damaged.

Effects of this embodiment will be described below.

With the rotary connector 100 in this embodiment, the connection terminal 42 has the cable attaching part 42a, which is connected to the strip-shaped conductor 31a at one end and also has the cable attaching part 42b at the other end, and the connection terminal 43 has the cable attaching part 43a, which is connected to the strip-shaped conductor 32a at one end and also has the external conductor 43b at the other end. The cable attaching part 42a and external conductor 42b are interconnected through the connecting part 42c, and the cable attaching part 43a and external conductor 43b are interconnected through the connecting part 43c. The base 41 has the first plane 41a and second plane 41b, which face each other. A plurality of connecting parts 42c and 43c are retained between the first plane 41a and the second plane 41b. The PTC device 45 is connected at an intermediate point between the connecting parts 43c and 43d and is placed on the same side as the first plane 41a. The cable retaining part 44 is disposed on the same side as the second plane 41b and retains the flat cables 31 and 32 and a plurality of cable attaching parts 42a and 43a.

Thus, the PTC device 45 and the flat cables 31 and 32 are disposed on opposite sides with respect to the base 41. Even if, therefore, the PTC device 45 generates heat, the heat is not easily transferred to the flat cables 31 and 32. This makes it possible to provide a highly reliable rotary connector that reduces damage to the flat cables 31 and 32.

With the rotary connector 100 in this embodiment, the connecting part 42c of the connection terminal 42 and the connecting part 43c of the connection terminal 43 may be exposed between the base 41 and the cable retaining part 44.

Accordingly, since the connecting part 42c of the connection terminal 42 and the connecting part 43c of the connection terminal 43 are exposed between the base 41 and the cable retaining part 44, heat can be released from the exposed connecting parts 42c and 43c, making it harder for heat to be transferred to the flat cables 31 and 32.

With the rotary connector 100 in this embodiment, the PTC retaining part 41c, which retains the PTC device 45, may be integrally formed with the first plane 41a of the base 41.

Accordingly, since the PTC retaining part 41c is integrally molded with the first plane 41a of the base 41, the body 45a of the PTC device 45 and the lead wire 45b can be retained at predetermined positions. This can prevent the lead wire 45b of the PTC device 45 from being broken due to vibration. In addition, integral molding can improve ease of assembling without increasing the number of parts.

With the rotary connector 100 in this embodiment, the PTC retaining part 41c may have the slit 41d formed along the PTC device 45.

Accordingly, variations in the outer dimensions of the PTC device 45 and deformation due to thermal expansion can be eliminated, enabling the PTC device 45 to be stably retained.

So far, the rotary connector according to an embodiment of the present invention has been specifically described. However, the present invention is not limited to the embodiment described above. Various changes are possible in the present invention without departing from the intended scope of the present invention. For example, the present invention can also be practiced by making variations as described below. These variations are also included in the technical range of the present invention.

(1) Although, in this embodiment, an example in which the number of a plurality of flat cables 30 is three has been described, the number of flat cables 30 may be appropriately changed according to the application to be practiced or a required function.

(2) Although, in this embodiment, an example in which the flat cable 31 has a single strip-shaped conductor 31*a*, the flat cable 32 has a single strip-shaped conductor 32*a*, and the flat cable 33 has five strip-shaped conductors 33*a* has been described, the number of strip-shaped conductors may be appropriately changed according to the application to be practiced or a required function.

What is claimed is:

1. A rotary connector comprising:
   a fixed housing having an outer tube;
   a movable housing having an inner tube, the movable housing being rotatably linked to the fixed housing;
   a plurality of flat cables, each of which has a strip-shaped conductor covered with an insulating film, the plurality of flat cables being wound in an annular space formed between the outer tube and the inner tube; and
   a connector connected to ends of the flat cables in a longitudinal direction of the flat cables; wherein
   the connector has a plurality of connection terminals, a base that retains the plurality of connection terminals, and a cable retaining part that retains the flat cables,
   a positive temperature coefficient (PTC) device is connected in series with at least one of the plurality of connection terminals,
   each of the plurality of connection terminals has a cable attaching part connected to the strip-shaped conductor at one end and also has an outer conductor at another end, the cable attaching part and the outer conductor being interconnected with a connecting part,
   the base has a first plane and a second plane, which face each other, a plurality of connecting parts being retained between the first plane and the second plane,
   the PTC device is connected at an intermediate point on the connecting part and is placed on the same side as the first plane, and
   the cable retaining part retains the flat cables and a plurality of cable attaching parts, the cable retaining part being placed on the same side as the second plane.

2. The rotary connector according to claim 1, wherein the connecting part of the connection terminal is exposed between the base and the cable retaining part.

3. The rotary connector according to claim 1, wherein a PTC retaining part, which retains the PTC device, is integrally formed with the first plane of the base.

4. The rotary connector according to claim 3, wherein the PTC retaining part has a slit formed along the PTC device.

* * * * *